(12) United States Patent
Laarousi

(10) Patent No.: US 12,384,396 B2
(45) Date of Patent: Aug. 12, 2025

(54) METHOD FOR DETERMINING AN ABILITY TO REACT

(71) Applicant: MERCEDES-BENZ GROUP AG, Stuttgart (DE)

(72) Inventor: Rihab Laarousi, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 198 days.

(21) Appl. No.: 17/926,180

(22) PCT Filed: Apr. 1, 2021

(86) PCT No.: PCT/EP2021/058735
§ 371 (c)(1),
(2) Date: Nov. 18, 2022

(87) PCT Pub. No.: WO2021/233604
PCT Pub. Date: Nov. 25, 2021

(65) Prior Publication Data
US 2023/0242135 A1    Aug. 3, 2023

(30) Foreign Application Priority Data
May 19, 2020    (DE) .................... 10 2020 003 018.1

(51) Int. Cl.
*B60W 50/14*    (2020.01)
*B60W 60/00*    (2020.01)

(52) U.S. Cl.
CPC .......... *B60W 50/14* (2013.01); *B60W 60/005* (2020.02); *B60W 2420/403* (2013.01);
(Continued)

(58) Field of Classification Search
CPC ............... B60W 50/14; B60W 60/005; B60W 2420/403; B60W 2540/225;
(Continued)

(56) References Cited

U.S. PATENT DOCUMENTS 9,904,287 B1    2/2018    Kuffner, Jr. et al.
10,095,228 B1    10/2018    Kuffner, Jr. et al.
(Continued)

FOREIGN PATENT DOCUMENTS

DE    102011084367 A1    4/2013
DE    102015001686 B4    3/2017
(Continued)

OTHER PUBLICATIONS

Japanese Final Notice of Reasons for Refusal mailed Mar. 26, 2024 for corresponding/related Japanese Application No. 2022-570404.
(Continued)

*Primary Examiner* — Anne Marie Antonucci
*Assistant Examiner* — Luis G Del Valle
(74) *Attorney, Agent, or Firm* — PATENT PORTFOLIO BUILDERS PLLC

(57) ABSTRACT

A method for determining the ability of a vehicle user to react in the automated driving mode of a vehicle uses detected image data of a driver monitoring camera. Using digital map data present in the vehicle and/or sensor data detected by the vehicle, it is determined whether at least one specified relevant object in a momentary vehicle environment is located in the field of vision of the vehicle user. For at least one detected specified relevant object in the momentary vehicle environment, detected image data of the driver monitoring camera is used to determine a duration and/or frequency the vehicle user directs their gaze to the detected relevant object. When a determined duration falls short of a specified minimum duration and/or when a determined gaze change frequency falls short of a minimum frequency, the ability of the vehicle user to react is evaluated as not given.

10 Claims, 4 Drawing Sheets

Figure 1:
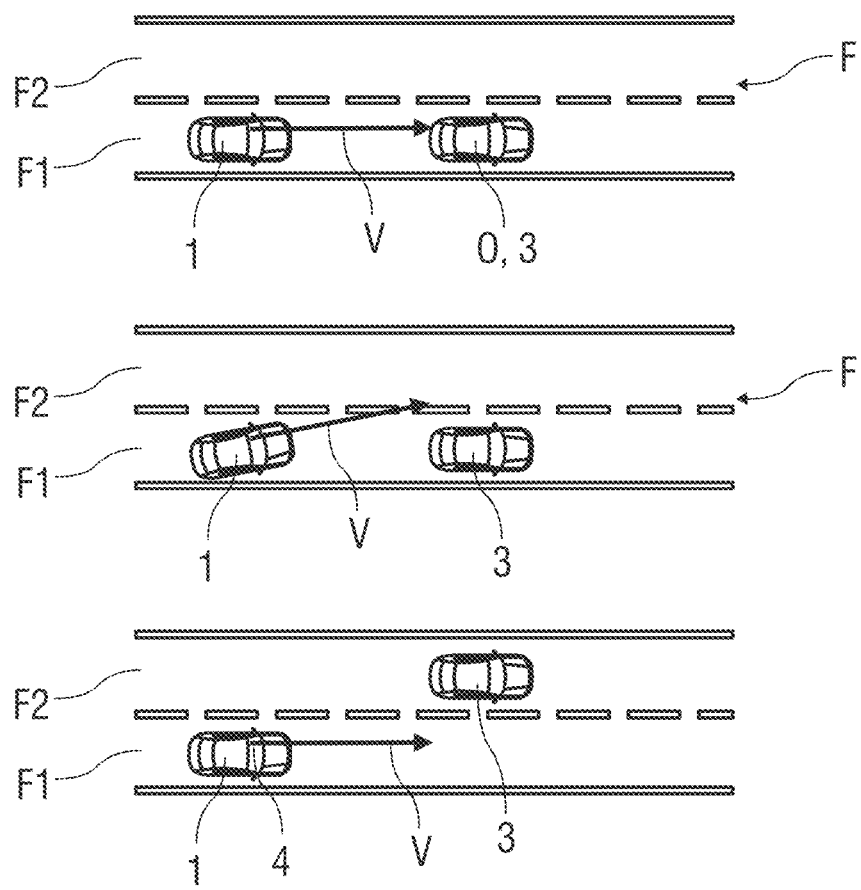

(52) U.S. Cl.
CPC ... *B60W 2540/225* (2020.02); *B60W 2552/50* (2020.02); *B60W 2552/53* (2020.02); *B60W 2554/20* (2020.02); *B60W 2555/60* (2020.02); *B60W 2556/40* (2020.02)

(58) Field of Classification Search
CPC ......... B60W 2552/50; B60W 2552/53; B60W 2554/20; B60W 2555/60; B60W 2556/40; B60W 2040/0818; B60W 2554/40; B60W 2554/402; B60W 2554/80; B60W 40/02; B60W 40/08; B60W 60/0015; B60W 60/0053; B60W 2050/0063
See application file for complete search history.

(56) References Cited

U.S. PATENT DOCUMENTS

| | | | |
|---|---|---|---|
| 10,528,832 | B2 | 1/2020 | Mudalige et al. |
| 10,849,543 | B2 | 12/2020 | Paudel et al. |
| 11,049,381 | B1* | 6/2021 | Sewell ............... G08B 21/0415 |
| 2011/0169625 | A1* | 7/2011 | James ................ B60W 30/095 340/439 |
| 2017/0297569 | A1* | 10/2017 | Nilsson .................. B60K 28/10 |
| 2017/0305440 | A1 | 10/2017 | Oba |
| 2018/0141568 | A1* | 5/2018 | Singhal ............. B60W 30/0956 |
| 2019/0143916 | A1* | 5/2019 | Mueller .................. B60R 21/01 701/31.5 |
| 2020/0000391 | A1* | 1/2020 | Hato ........................ G06F 3/011 |
| 2021/0129748 | A1* | 5/2021 | Tamrakar ................ G06F 3/167 |
| 2021/0312777 | A1* | 10/2021 | Ghourchian ....... G08B 13/2491 |

FOREIGN PATENT DOCUMENTS

| | | |
|---|---|---|
| DE | 102016011246 A1 | 4/2017 |
| DE | 102017202194 A1 | 8/2018 |
| DE | 102018108200 A1 | 11/2018 |
| DE | 102017214535 A1 | 2/2019 |
| DE | 102019109375 A1 | 10/2019 |
| DE | 112017006982 T5 | 10/2019 |
| DE | 102019115455 A1 | 12/2019 |
| DE | 102018217183 A1 | 4/2020 |
| JP | 2015185088 A | 10/2015 |
| JP | 2016115023 A | 6/2016 |
| JP | 2018151765 A | 9/2018 |
| JP | 2018206366 A | 12/2018 |
| JP | 2019011026 A | 1/2019 |
| JP | 2020052643 A | 4/2020 |
| WO | 2018158950 A1 | 9/2018 |

OTHER PUBLICATIONS

International Search Report and Written Opinion mailed Jul. 5, 2021 in related/corresponding International Application No. PCT/EP2021/058735.

Office Action created Nov. 30, 2020 in related/corresponding DE Application No. 10 2020 003 018.1.

Japanese Notice of Reasons for Refusal mailed Nov. 14, 2023, for corresponding/related Japanese Application No. 2022-570404, including English translation (8 pages).

Office Action dated Mar. 31, 2025 for corresponding/related Japanese Application No. 2022-7039864.

* cited by examiner

METHOD FOR DETERMINING AN ABILITY TO REACT

BACKGROUND AND SUMMARY OF THE INVENTION

Exemplary embodiments of the invention relate to a method for determining the ability of a vehicle user to react in the automated driving mode of a vehicle by means of detected image data of a driver monitoring camera.

DE 10 2015 001 686 B4 discloses a method and a device for recognizing the ability of a driver to react during the automated driving of a motor vehicle. Here, a first evaluation of the ability to react is achieved by means of a camera monitoring of the driver, wherein a second evaluation of the ability to react is achieved by means of recognition of the operation of an operating unit by the driver. The ability to react is classified as given if the first evaluation and/or the second evaluation have/has recognized the ability to react as given. In the first evaluation of the ability to react by means of camera monitoring of the driver, the classification as given is made if at least one eye of the driver is open during a minimum portion of a determined time interval. The ability to react is not classified as given if the operating unit is operated by a person other than the driver, or rhythmically.

Further, DE 10 2016 011 246 A1 describes a method for the surveillance of a condition of at least one passenger of a vehicle. The method provides for the lighting of a head of the passenger by means of at least one light source, which is alternately turned on and off. A light reflected from the eyes of the passenger is detected by means of at least one sensor, wherein it is additionally checked whether the reflection changes depending on the lighting by the light source, and whether at least one lid activity and/or head movement of the passenger are/is detected.

Exemplary embodiments of the invention are directed to a method for determining the ability of a vehicle user to react in the automated driving mode of a vehicle.

A method for determining the ability of a vehicle user to react in the automated driving mode of a vehicle, by means of detected image data of a driver monitoring camera, provides, according to the invention, for the determining of whether at least one specified object in a momentary vehicle environment is located in the field of vision of the vehicle user, this being determined by means of digital map data present in the vehicle and/or by means of sensor data detected by the vehicle. For at least one detected specified object in the momentary vehicle environment, it is determined, by means of detected image data of the driver monitoring camera, for what duration and/or frequency the vehicle user directs their gaze to the detected at least one specified object, and in the event that a determined duration falls short of a specified minimum duration and/or in the event that a determined gaze change frequency falls short of a minimum frequency, the ability of the vehicle user to react is evaluated as not given.

By adopting the method, the ability of the vehicle user of the vehicle to react during the automated driving mode, in which the vehicle carries out a driving task entirely independently, can be determined. Here, a vehicle user is understood to mean a person who carries out a driving task of a vehicle in the manual driving mode.

In particular, the ability to react is determined in order to ascertain whether the vehicle user can react correctly with respect to the driving task in the event of a takeover request determined by the system, and also detects a present situation correctly. A situational awareness here requires that objects and/or areas outside of the vehicle that are relevant depending on the situation are seen, and that these are also perceived.

In an embodiment of the method, an object is determined to be relevant if, in the manual driving mode of the vehicle, such an object is located in the field of vision of the vehicle user for a specified duration and/or frequency, i.e., if the vehicle user directs their gaze towards the object for a specified duration and/or frequency, and if the object is taken into account during vehicle control by the vehicle user.

If no gaze, or a comparatively short gaze of the vehicle user towards a specified relevant object is detected by means of the recorded image data, it is interpreted that the vehicle user did not perceive the specified relevant object, and correspondingly has at least a low ability to react.

In a possible embodiment of the method, as objects, at least one further vehicle located in front of, to the side of and/or behind the vehicle, a road sign, a traffic light, a warning light, a lane marking, a reflector post, crash barrier, guidance beacon and/or bridge pier are specified and/or taken into account as relevant objects in the determining of the ability of the vehicle user to react.

Such objects that could and/or should influence vehicle control, and thus a vehicle user's way of driving in the manual driving mode of the vehicle, therefore count as relevant and are specified as such.

A development of the method provides for the determining and/or taking into account a size, a visibility, a relative position, and/or an absolute position of a specified object in relation to the field of vision of the vehicle user. In this way, it can be ascertained whether the vehicle user is in a position to be able to see such a determined object from the vehicle at all.

Additionally, an embodiment of the method provides for the determining a direction of gaze of the vehicle user as a gaze vector, which is extrapolated for the determining of the field of vision. In particular, the gaze vector outside the vehicle is extrapolated, and it is determined whether the extrapolated gaze vector hits the specified relevant object, and thus whether the specified relevant area is in the field of vision of the vehicle user.

In particular, a possible further embodiment of the method provides for the specifying of a midpoint between the pupils of the vehicle user as a starting point of the gaze vector. In particular, the midpoint between the pupils is specified as the starting point when the eyes look straight ahead with a frontally aligned head of the vehicle user. The ascertaining of the starting point of the gaze vector serves to transfer the specified relevant object as an area, in particular on a windscreen, and to determine by means of the area whether the vehicle user is looking at this area.

In a further embodiment, depending on a shape and/or a size of a specified relevant object, an area around this object is defined. In particular, an area around the specified relevant object is defined if this object has a comparatively complex shape and/or size. The smaller this defined area is, the more precisely a gaze-to-object assignment is possible, such that it can be detected whether the specified relevant object is located in the field of vision of the vehicle user, and this specified relevant object can be recognized by the vehicle user as such.

If several objects are detected, then in a possible embodiment, a visibility in relation to a specified relevant object is evaluated by means of a position, size, and/or material property of the object. In other words, the visibility of the specified relevant object is checked, such that it can be largely ensured that the specified relevant object is located in the field of vision of the vehicle user, and is not obscured by a further object. It is therefore checked whether the specified relevant object is visible to the vehicle user.

In a possible development, a degree of perception and/or a situational awareness are/is determined specifically to the vehicle user by means of gaze behavior analysis, wherein a gaze behavior of a vehicle user is compared with a usual gaze behavior. The comparison is based, in particular, on a detected gaze behavior of the vehicle user during a manual driving mode and a gaze behavior in the automated driving mode, such that it can be determined whether or not the vehicle user has perceived a specified relevant object, for example a road sign, in the automated driving mode of the vehicle.

If, on the basis of the gaze behavior of the vehicle user, it is determined that the ability to react, especially to take over the driving task, is not given, at least one warning is emitted in the vehicle, which the vehicle user must acknowledge within a specified period of time.

Here, the warning is emitted to restore the ability of the vehicle user to react, such that, in the event of a takeover request, they are in a position to follow this instruction.

BRIEF DESCRIPTION OF THE DRAWING FIGURES

Exemplary embodiments of the invention are illustrated in more detail in the following by means of drawings.

Figure 2:
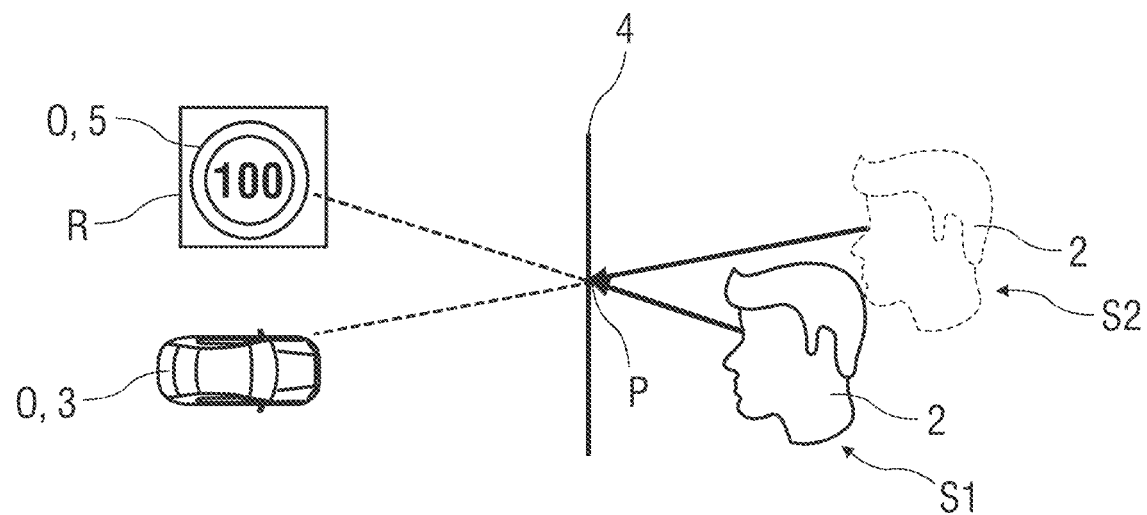
Figure 3:
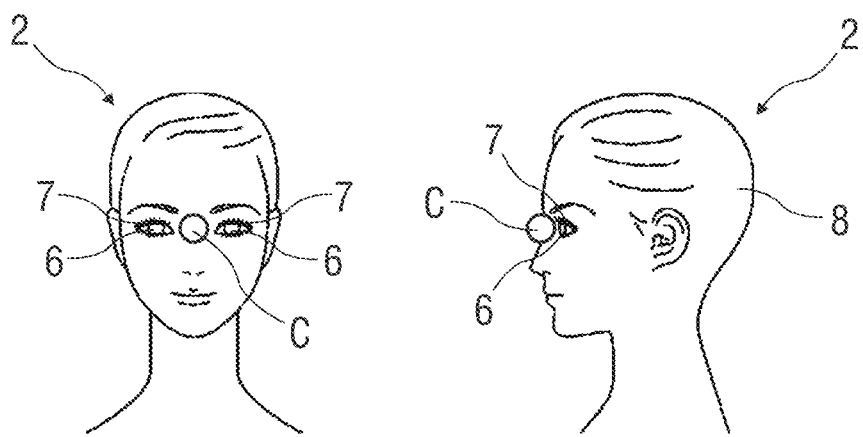
Figure 4:
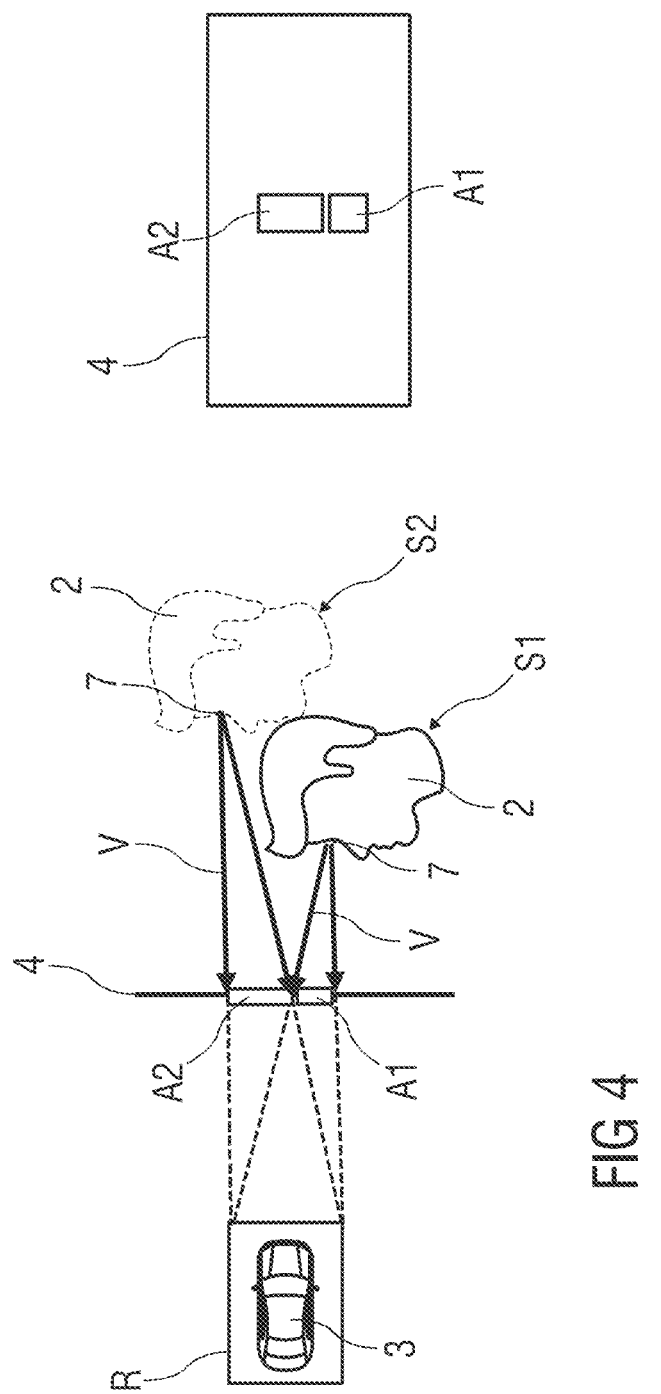
Figure 5:
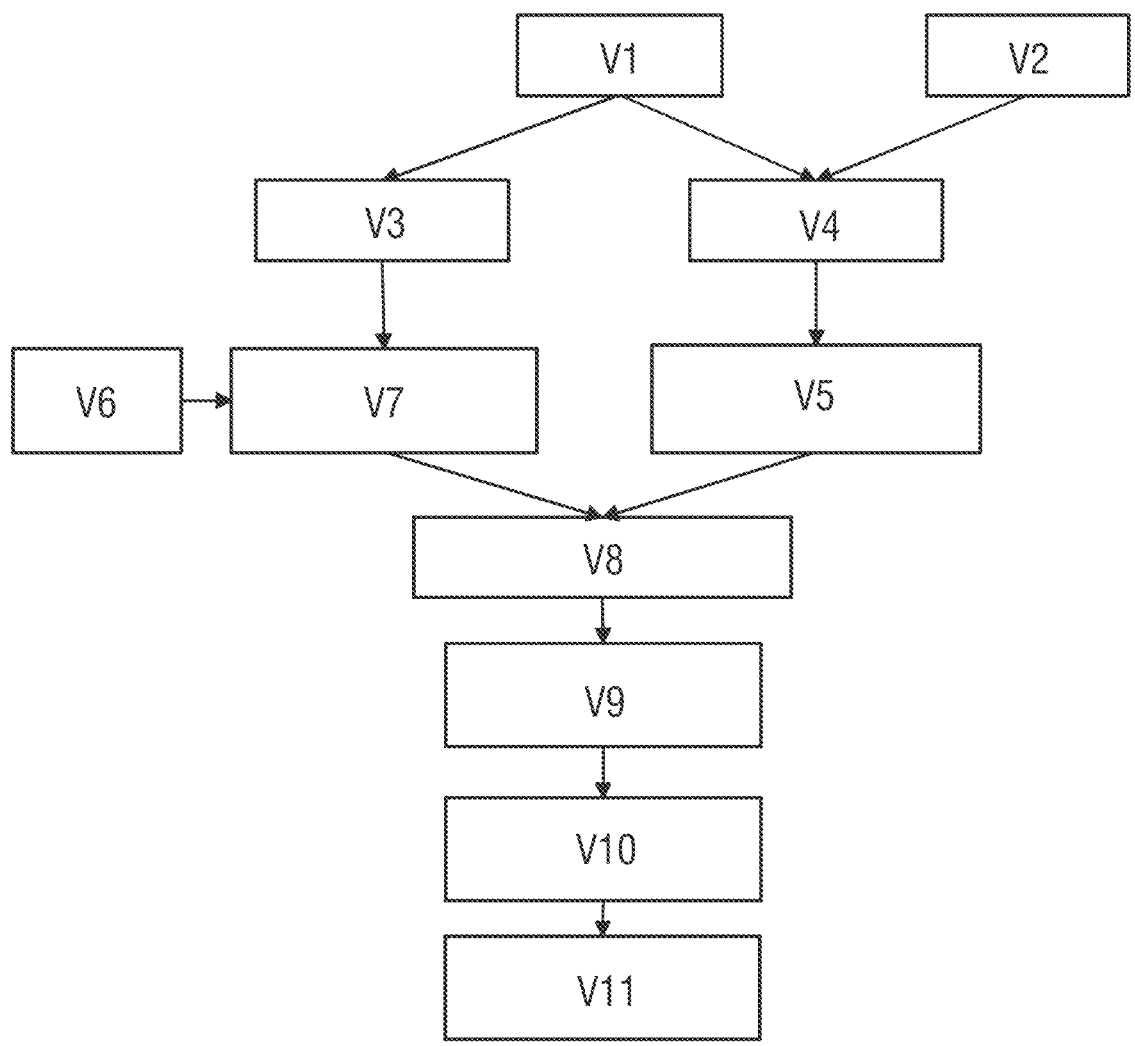

In the drawings:

FIG. 1 shows, schematically, three views with a gaze vector of a vehicle user in a vehicle, FIG. 2 shows, schematically, a vehicle user in two different positions with respective gaze vectors, FIG. 3 shows, schematically, a front view and a side view of a vehicle user with a marked starting point of a gaze vector, FIG. 4 shows, schematically, a vehicle user in two different positions and a transferred area of an object on a windscreen and FIG. 5 shows, schematically, a method sequence for determining the ability of a vehicle user to react in the automated driving mode of a vehicle.

Parts corresponding to one another are labelled with the same reference numerals in all figures.

DETAILED DESCRIPTION

In FIG. 1, three different views are shown, with a section of roadway F comprising two lanes F1, F2, wherein a vehicle 1 is driving in a right-hand lane F1, and a gaze vector V of a vehicle user 2, shown in FIGS. 2 to 4, who is a driver of the vehicle 1 in the manual driving mode. A further vehicle 3 is likewise driving in the right-hand lane F1 in a top view and a middle view, and in a left-hand lane F2 in a bottom view.

The gaze vector V of the vehicle user 2 is the same in all three views, wherein the vehicle user 2 is observing a different object O in each case.

In the first view A1, the gaze vector V is directed towards the further vehicle 3 as object O, which is driving ahead of the vehicle 1.

In the second view A2, the vehicle 1 intends to change lanes to the left-hand lane F2, wherein the vehicle 1 has already pulled out, such that the gaze vector V is already directed towards the left-hand lane F2.

In the third view A3, the further vehicle 3 is driving in the left-hand lane F2, and the vehicle 1 is driving in the right-hand lane F1, wherein the gaze vector V of the vehicle user 2 is directed straight ahead, and so to the right-hand lane F1.

In the following, a method is described for the determining of the ability of the vehicle user 2 to react in the automated driving mode of the vehicle 1, wherein a gaze behavior of the vehicle user 2 is detected and analyzed.

In the vehicle 1, there is located a driver monitoring camera that is not shown in more detail and that continuously detects image data during a driving operation, regardless of whether this operation is implemented in automated fashion or manually, wherein a detection area of the driver monitoring camera is directed at the vehicle user 2.

By means of the recorded image data of the driver monitoring camera, a gaze direction of the vehicle user 2, i.e., the gaze vector V, is determined.

In FIG. 1, by means of the three views A1 to A3, it is particularly illustrated that the gaze vector V is insufficient to identify an object O and/or an area outside the vehicle 1, towards which a gaze of the vehicle user 2 is directed.

By means of the gaze vector V and geometric data of the vehicle 1, it can be determined whether the vehicle user 2 is looking out of the vehicle 1, e.g., through a windscreen 4 of the vehicle 1, and so whether their gaze is directed towards the windscreen 4. Here, an allocation of whether the gaze of the vehicle user 2 is directed at a particular object O and/or at a particular area outside of the vehicle 1 is not possible.

By means of the method, based on the determined gaze vector V of the vehicle user 2 and based on an object O detected outside the vehicle 1 and its properties, for example its size and position, it is determined whether the vehicle user 2 has seen this object O.

The fact that the vehicle user 2 sees an object O and/or an area means that a gaze of the vehicle user 2 is directed towards this object O and/or this area, and the object O and/or the area is located in the field of vision of the vehicle user 2 for a minimum duration.

In the following, the method is described in relation to the detection of an object O by the vehicle user, wherein the detection of an area is carried out analogously by means of the method.

As it is determined how long the gaze of the vehicle user 2 is directed towards the object O outside the vehicle 1, it can be ruled out to the greatest possible extent that subconscious, comparatively short gazes of the vehicle user 2, which contribute hardly or not at all to the perception of a situation, are taken into account.

To determine that an object O outside the vehicle 1 is located in the field of vision of the vehicle user 2, the gaze vector V outside the vehicle 1 is extrapolated. In particular, an object O is detected by the vehicle user 2 and perceived if the extrapolated gaze vector V hits the object O, as shown in FIG. 2.

In particular, FIG. 2 shows the vehicle user 2 in two sitting positions S1, S2, and corresponding extrapolated gaze vectors V, a significantly simplified windscreen 4 of the vehicle 1 and two objects O outside the vehicle 1. Here, the vehicle user 2 observes, in a lower sitting position S1 located nearer to the windscreen 4, a road sign 5 showing the speed limit as object O, and in the other, further sitting position S2, shown by means of a dotted line, a further vehicle 3 as an object.

The vehicle user 2 observes another object O in the particular sitting position, wherein their gaze in respect of the windscreen 4 is directed towards one and the same point P.

For a comparatively more complex shape and/or size of a particular object O, an area around the object O can be defined, as FIG. 2 shows. According to the present exemplary embodiment in FIG. 2, the road sign 5 is surrounded by a virtual rectangle R as object O. Alternatively, another shape can also be provided as a defined area surrounding the object O, wherein the smaller this area is, the more precise a gaze-to-object allocation.

Additionally, a visibility of an object O is checked, in particular if several objects O are located in the same area. For example, if two objects O from the view of the vehicle user 2 are located in the vehicle user's field of vision, then the extrapolated gaze vector V of the vehicle user 2 can hit both objects O. In such a case, a more distant object O is presumably obscured by a closer object O, to which the gaze of the vehicle user 2 is allocated.

For the evaluation of the visibility and obscuring of an object O by a further object O, a position, size and/or material property of the objects O can be used.

In an embodiment, the object O, or the area of the object O, is transferred to a surface A1, A2, in particular the windscreen 4, to determine whether the object O is located in the field of vision of the vehicle user 2. Here, the transfer of the object O onto the surface A1, A2 of the windscreen 4, as is shown in FIG. 4, is dependent on a number of parameters, e.g., on a starting point C of the gaze vector V shown in FIG. 3, and a relative position of the object O, in particular in relation to the starting point C, as well as geometric data of the surface A.

FIG. 3 shows an exemplary ascertaining of the starting point C of the gaze vector V, wherein the starting point C is specified as the midpoint between pupils 6 of the vehicle user 2, when the eyes 7 are looking straight ahead with a frontally aligned head 8.

If the position of the starting point C changes as a result of the positioning of the head 8, for example in a sideways direction, the surface A1, A2 is positioned on the windscreen 4 correspondingly, as shown in more detail in FIG. 4. For this reason, the size and a sitting position of the vehicle user 2 play an indirect role in this transfer of the object O onto the surfaces A1, A2 of the windscreen 4.

FIG. 4 shows the vehicle user 2 in two different sitting positions S1, S2, with the area of the object O transferred onto a surface A1, A2 of the windscreen 4 in the form of a further vehicle 3.

Additionally, in FIG. 4, a front view of the windscreen 4, with both surfaces A1, A2 of the object O, is shown.

If the vehicle user 2 has the sitting position S1, the object O is transferred to a surface A1 of the windscreen 4 in the form of a further vehicle 3, whilst in the further sitting position S2, the object O is transferred to a further surface A2 of the windscreen 4. In this way, the object O is transferred to several surfaces A1, A2 of the windscreen 4, especially in relation to the particular sitting position S1, S2.

The method provides a gaze behavior analysis, in order to thus determine a degree of perception and/or a quality of perception. The gaze behavior of the vehicle user 2 is also compared with their usual gaze behavior, in particular in the manual driving mode of the vehicle 1. In this way, it can in particular be determined whether and/or with what degree of perception and/or with what quality of perception the vehicle user 2 has perceived a specified relevant object O, e.g., a certain road sign 5, in the automated driving mode of the vehicle 1. The gaze behavior of the vehicle user 2 in relation to the category of the specified relevant object O, e.g., in relation to road signs 5, during several manually performed driving operations, can also be compared with their gaze behavior in relation to the object O.

If, for example, no gaze or a comparatively short gaze toward the specified relevant object O is detected, in particular a gaze falling short of the minimum duration, it can therefore be deduced that the vehicle user 2 has not perceived the specified relevant object O, and/or the degree of perception and/or the quality of perception is comparatively low. In this case, it can be provided that the specified relevant object O, in particular a road sign, is shown in a display area of an instrument panel.

If, however, it is determined by means of the gaze behavior analysis that the vehicle user 2 has sufficiently perceived the specified relevant object O, the object is not shown.

It is also conceivable that the usual gaze behavior is determined not only specifically to the vehicle user, but also dependently on the place and/or situation. If the vehicle user 2 frequently drives the same routes, then a divergent gaze behavior of the vehicle user 2 at a specific location on a particular route can be ascertained.

In a possible embodiment, the method provides for the carrying out of the gaze behavior analysis under particular operational conditions and/or conditions of the vehicle user 2. For example, the gaze behavior of the vehicle user 2 can be analyzed for the evaluation of their degree of perception and/or of their quality of perception or of their situational awareness in the case of a request for the driving task to be taken over by the vehicle user 2, the takeover request being determined by the system.

A corresponding result can be taken into account by the system in a transfer of a driving responsibility to the vehicle user 2. For example, the vehicle user 2 decides relatively suddenly to carry out a particular action, e.g., to change lane. Here, in particular by means of the gaze behavior analysis, it is determined that the vehicle user 2 has not detected, i.e., seen, all of the objects O relevant for this action. For example, the vehicle user 2 has not seen a vehicle 3 nearing from behind, wherein the vehicle user 2 is informed of this and/or the intended action is repressed or not supported by the system.

A further embodiment provides for the usage of gaze data of several vehicle users 2, to determine the gaze behavior of a majority. In this way it can be determined which objects O can be specified as relevant objects O, and with what degree of perception and/or with what quality of perception most vehicle users 2 view these objects O. For example, these objects O are further vehicles 3, road signs 5, traffic lights, warning lights, lane markings, reflector posts, crash barriers, guidance beacons, bridge piers, etc.

By means of the gaze behavior of the vehicle user 2 it is therefore determined whether the vehicle user 2 has a sufficient degree of perception and/or a sufficient quality of perception or a sufficient situational awareness.

If this is the case, then the reaction capability of the vehicle user 2 is evaluated as given. If there is a suspicion of a reduced degree of perception and/or a reduced quality of perception or a reduced situational awareness, the ability of the vehicle user 2 to react is evaluated as not given.

In particular, the ability to react is evaluated as not given if the vehicle user 2, for example, does not direct their gaze towards one of the specified relevant objects O, or the minimum duration in relation to a gaze duration is not satisfied.

Alternatively, or additionally, the reaction capability is evaluated as not given if a gaze change frequency falls short of a minimum frequency, i.e., a determined gaze change frequency falls short of a specified frequency threshold value. The gaze change frequency is determined by ascertaining a mean duration between changes of the gaze towards different objects O. The shorter this duration is, the higher the gaze change frequency.

A comparatively low gaze change frequency can be indicative of a distraction of the vehicle user 2, wherein the distraction can result from a secondary action inadmissible for the automated driving operation. A secondary action is inadmissible for the automated driving operation, as in some instances the vehicle user 2 will concentrate too much on the secondary action, and so rarely or never direct their gaze to a specified relevant object O outside the vehicle 1.

As described above, the specified relevant objects O are objects O that the vehicle user 2 observes in a similar driving situation in the manual driving mode of the vehicle 1, and which are relevant for decision-making in relation to the manual driving mode, and so for the vehicle control.

The location of relevant objects O of this kind on a section of roadway momentarily driven along by the vehicle 1 is determined by means of digital map data present in the vehicle and/or with the assistance of sensor data detected by the vehicle.

If, as described above, it is determined that the ability of the vehicle user 2 to react is not given, measures for the recovery or restoring of the ability to react are initiated, in particular within the vehicle.

A measure to be initiated is the emission of a warning in the vehicle 1 to the vehicle user 2, which the vehicle user 2 must acknowledge within a specified length of time to confirm their ability to react. If the required acknowledgement does not occur within the specified duration, moreover after one or several levels of escalation optionally provided, the vehicle user 2 is required to assume the driving task. If the vehicle user 2 also fails to satisfy this request within a specified duration, the vehicle 1 is deliberately brought to a safe stop in the automated driving mode.

The same action is then taken if the driver monitoring camera recognizes a sleep event on the part of the vehicle user 2 by means of detected image data. A sleep event is present if the vehicle user 2 has closed their eyes 7 in an order of magnitude of seconds (microsleep) or longer.

In addition to determining the gaze change frequency of the vehicle user 2, the recorded image data of the driver monitoring camera can also be evaluated to the effect that it is determined whether the vehicle user 2 is in a position capable of assuming control, i.e., if they are in a position from which the vehicle user 2 can take over the driving task of the vehicle 1.

By means of a facial recognition, the head 8 of the vehicle user 2 is recognized in the recorded image data, and it is checked whether the head 8 is within a specified valid area.

Furthermore, by means of image processing methods, deceptions in relation to recorded image data, e.g., caused by images, dolls etc. are recognized to avoid cases of misuse, in which the vehicle user 2 feigns their presence in the vehicle seat. In this way, for example, it can mostly be ruled out that the vehicle user 2 is able to leave their seat and climb into a rear area of the vehicle 1.

If it is determined that the vehicle user 2 is not located in their vehicle seat or is not in a position to take over, the automated driving mode is ended or, if it isn't activated, it is not made available for activation.

Additionally, it can be provided that, as described in DE 10 2015 001 686 B4, operation actions of the vehicle user 2 are detected, and a rate of blinking and movements of the head 8 of the vehicle user 2 are detected to determine an activity of the vehicle user 2, and from this to draw conclusions about their ability to react.

FIG. 5 shows an overview of the sequence of the method for determining the ability of the vehicle user 2 to react in the automated driving mode of the vehicle 1 by means of detected image data of the driver monitoring camera.

In a first method step V1, it is determined by means of map data present in the vehicle and/or by means of sensor data detected by the vehicle that a specified relevant object O is located in an area immediately in front of the vehicle 1.

A second method step V2 provides for the detection of a gaze direction of the vehicle user 2 by means of image data of the driver monitoring camera, wherein, in a third method step V3, the detected specified relevant object O is classified, and in a fourth method step V4, a gaze-to-object allocation is performed. In particular, the classification is performed to the effect that it is determined whether the relevant object O is a road sign 5, in particular a signplate, i.e., a common signplate, a road sign 5 with a speed specification, or a road sign 5 with a speed specification in a bend, or a vehicle ahead. For a vehicle ahead, a differentiation is made depending on whether the further vehicle 3 is in a lane F1 of the vehicle 1.

If, by means of the gaze direction of the vehicle user 2, it can be determined that the specified relevant object O is located in the field of vision of the vehicle user 2, it is determined in a fifth method step V5 whether, by means of the gaze behavior of the vehicle user 2, it can be detected whether the vehicle user 2 has detected properties in relation to the specified relevant object O.

Data about a usual gaze behavior of the vehicle user 2 is saved in a memory of the vehicle 1 and is called up in a sixth method step V6, wherein, in a seventh method step V7, the usual gaze behavior of the vehicle user 2 in relation to the classified relevant object O is determined.

In an eighth method step V8, the momentary gaze behavior of the vehicle user 2 in the automated driving mode is compared with the usual gaze behavior, in particular in the manual driving mode of the vehicle 1.

Subsequently, in a ninth method step V9, the evaluation of the degree of perception and/or quality of perception is performed, with these being compared with a target degree of perception or a target quality of perception in a tenth method step V10.

An eleventh method step V11 provides a confirmation of the perception in relation to the specified relevant object O, wherein, where confirmation is not achieved, the ability of the vehicle user 2 to react is evaluated as not given.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining an ability of a vehicle user to react in an automated driving mode of a vehicle, the method comprising:

capturing, by a driver monitoring camera of the vehicle, image data of the vehicle user operating the vehicle in a manual driving mode;

determining, using the captured image data of the vehicle user operating the vehicle in the manual driving mode, a manual driving mode gaze behavior of the vehicle user to least one relevant object at a specific location, wherein the manual driving mode gaze behavior includes a duration or frequency of the vehicle user directing their gaze to the at least one relevant object at the specific location while operating the vehicle in the manual driving mode;

capturing, by the driver monitoring camera of the vehicle, image data of the vehicle user while the vehicle operates in an autonomous driving mode;

determining, while the vehicle is operating in the autonomous driving mode, and using digital map data present in the vehicle or using sensor data detected by the vehicle, whether the at least object in at the specific location is located in a field of vision of the vehicle user;

determining, using the captured image data of the vehicle user while the vehicle is operating in the autonomous driving mode, an autonomous driving mode gaze behavior of the vehicle user of the at least one relevant object at the specific location, wherein the autonomous driving mode gaze behavior includes a duration or frequency of the vehicle user directing their gaze to the at least one relevant object at the specific location while the vehicle is operating in the autonomous driving mode;

comparing the determined autonomous driving mode gaze behavior to the determined manual driving mode gaze behavior;

determining, based on the comparison of the determined autonomous driving mode gaze behavior to the determined manual driving mode gaze behavior, that the ability of the vehicle user to react is not given;

issuing, by the vehicle, a warning to the vehicle user; and maintaining the vehicle in the autonomous driving mode and bringing the vehicle to a safe stop when the vehicle user does not acknowledge the warning within a specified length of time.

2. The method of claim 1, wherein the at least one relevant object is an object that, in the manual driving mode of the vehicle, the object is located in the field of vision of the vehicle user for a specified duration or frequency, and if the object is taken into account during vehicle control by the vehicle user.

3. The method of claim 1, wherein the at least one relevant object is at least one further vehicle located in front of, to a side of or behind the vehicle, a road sign, a traffic light, a warning light, a lane marking, a reflector post, crash barrier, guidance beacon, or bridge pier.

4. The method of claim 1, wherein the determination of the manual driving mode gaze behavior and the autonomous driving mode gaze behavior account for a size, a visibility, a relative position, or an absolute position of the at least one relevant object in relation to the field of vision of the vehicle user.

5. The method of claim 1, a direction of gaze of the vehicle user is determined as a gaze vector, which is extrapolated for the determining of the field of vision.

6. The method of claim 5, wherein a midpoint between pupils of the vehicle user is specified as a starting point of the gaze vector.

7. The method of claim 1, further comprising:

defining an area around the at least one relevant object depending on a shape or a size of the at least one relevant object.

8. The method of claim 1, wherein the at least one relevant object includes several relevant objects, and a visibility of each of the several relevant objects is determined using a position, size or material property of each of the several relevant objects.

9. The method of claim 1, wherein a degree of perception or a situational awareness is determined for the vehicle user for the determination of the manual driving mode gaze behavior and the autonomous driving mode gaze behavior.

10. The method of claim 1, wherein the manual driving mode gaze behavior of the vehicle user is detected from a plurality of occasions during which the vehicle user is manually driving the vehicle at the specific location.

* * * * *